United States Patent
Panotopoulos

(10) Patent No.: US 12,514,630 B2
(45) Date of Patent: Jan. 6, 2026

(54) MULTIFUNCTIONAL SURGICAL INSTRUMENT

(71) Applicant: Christos Panotopoulos, Limassol (CY)

(72) Inventor: Christos Panotopoulos, Limassol (CY)

( * ) Notice: Subject to any disclaimer, the term of this patent is extended or adjusted under 35 U.S.C. 154(b) by 0 days.

(21) Appl. No.: 17/925,292

(22) PCT Filed: May 12, 2021

(86) PCT No.: PCT/EP2021/062596
§ 371 (c)(1),
(2) Date: Nov. 14, 2022

(87) PCT Pub. No.: WO2021/228924
PCT Pub. Date: Nov. 18, 2021

(65) Prior Publication Data
US 2023/0138559 A1    May 4, 2023

(30) Foreign Application Priority Data

May 13, 2020 (GR) .............................. 20200100249

(51) Int. Cl.
*A61B 18/14* (2006.01)
*A61B 17/32* (2006.01)
(Continued)

(52) U.S. Cl.
CPC .... *A61B 18/1442* (2013.01); *A61B 2017/305* (2013.01); *A61B 2017/320044* (2013.01);
(Continued)

(58) Field of Classification Search
CPC .......... A61B 18/1442; A61B 2017/305; A61B 2017/320044; A61B 2018/00589;
(Continued)

(56) References Cited

U.S. PATENT DOCUMENTS

| | | | |
|---|---|---|---|
| 3,916,909 A | * 11/1975 | Kletschka | A61B 17/30 604/35 |
| 5,643,304 A | 7/1997 | Schechter et al. | |
| 5,984,939 A | * 11/1999 | Yoon | A61B 18/1442 606/205 |
| 6,511,416 B1 | 1/2003 | Green, II et al. | |

(Continued)

FOREIGN PATENT DOCUMENTS

| | | |
|---|---|---|
| CN | 102811669 A | 12/2012 |
| CN | 204274634 U | 4/2015 |

(Continued)

*Primary Examiner* — Sean W Collins
(74) *Attorney, Agent, or Firm* — Thorpe North & Western, LLP; David W. Osborne

(57) ABSTRACT

A multifunctional surgical instrument (1) is provided. The multifunctional surgical instrument (1) comprises a proximal portion (13) and two legs (14), each leg comprising a distal end (11, 12), wherein a default position of the multifunctional surgical instrument is an open position, wherein the distal ends (11, 12) of the legs (14) do not meet in the open position, characterized in that each leg (14) comprises an aspiration half-channel (26, 27), the proximal portion (13) comprises an aspiration connection (29) and at least one of the distal ends (11, 12) comprises at least one aspiration orifice (28), wherein the two half-channels (26, 27) are configured to form an air-tight and water-tight continuous channel (25) connecting the at least one aspiration orifice (28) to the aspiration connection (29) when the multifunctional surgical instrument is in a fully closed position and are configured to open the aspiration channel (25) when the multifunctional surgical instrument is not in the fully closed position.

16 Claims, 14 Drawing Sheets

(51) Int. Cl.
    *A61B 17/30* (2006.01)
    *A61B 18/00* (2006.01)
    *A61B 18/12* (2006.01)

(52) U.S. Cl.
    CPC ............ *A61B 2018/00589* (2013.01); *A61B 2018/00625* (2013.01); *A61B 2018/00994* (2013.01); *A61B 2018/126* (2013.01); *A61B 2018/1415* (2013.01); *A61B 2018/1457* (2013.01); *A61B 2018/1462* (2013.01); *A61B 2217/005* (2013.01); *A61B 2218/007* (2013.01)

(58) Field of Classification Search
    CPC .......... A61B 2018/00625; A61B 2018/00994; A61B 2018/126; A61B 2018/1415; A61B 2018/1462; A61B 2217/005; A61B 2218/007
    See application file for complete search history.

(56) References Cited

U.S. PATENT DOCUMENTS

| | | | |
|---|---|---|---|
| 6,926,717 | B1 * | 8/2005 | Garito ............... A61B 18/1442 606/51 |
| 2006/0287651 | A1 | 12/2006 | Bayat |
| 2013/0006260 | A1 | 1/2013 | Nakajima et al. |
| 2015/0282871 | A1 * | 10/2015 | Wang ...................... B25B 7/04 606/52 |
| 2017/0319264 | A1 * | 11/2017 | Haupt ............... A61B 18/1442 |
| 2017/0325878 | A1 * | 11/2017 | Messerly ............ A61M 3/0283 |
| 2020/0229839 | A1 * | 7/2020 | Lai .................... A61B 17/3421 |

FOREIGN PATENT DOCUMENTS

| | | |
|---|---|---|
| CN | 105407823 A | 3/2016 |
| GB | 2513613 A | 11/2014 |
| RU | 2083170 C1 | 7/1997 |
| WO | WO 2014/177866 A2 | 11/2014 |
| WO | WO 2015/073643 | 5/2015 |

\* cited by examiner

MULTIFUNCTIONAL SURGICAL INSTRUMENT

TECHNICAL FIELD

The present invention relates to the field of surgical instruments, in particular, to surgical aspiration instruments, more in particular to multifunctional surgical instruments combining aspiration with any one or more of the following: irrigation, fine tissue dissection, blunt tissue dissection, atraumatic tissue holding, coagulation, desiccation, fulguration and vaporization.

STATE OF THE ART

The use of surgical instruments for each of: aspiration, irrigation, fine and blunt tissue dissection, atraumatic tissue holding and electrosurgery is known in the art. Traditionally, a different instrument is used by a surgeon to perform each of these functions. The change of instruments contributes significantly to the operative time required to carry out a surgical procedure.

According to a 2018 study by Cheng et al., "prolonged operative time is associated with an increase in the risk of complications. Pooled analyses of 66 observational studies showed that the likelihood of complications increased significantly with prolonged operative duration, approximately doubling with operative time thresholds exceeding 2 or more hours. Meta-analyses also demonstrated a 14% increase in the likelihood of complications for every 30 min of additional operating time. Given the adverse consequences of complications, decreased operative times should be a universal goal for surgeons, hospitals, and policy-makers" (Cheng et al. Prolonged operative duration is associated with complications: a systematic review and meta-analysis, Journal of Surgical Research. 2018; 229: 134-144).

Tissue cutting (i.e. fine dissection), blunt tissue dissection, atraumatic tissue holding, bipolar tissue coagulation, surgical field irrigation and aspiration are examples of the most frequent surgical actions, consuming most of the time in the majority of operations, due to the continuous need for instrument changes. Currently a lot of time is lost due to coordination of all the above functions, since the surgeon needs to switch frequently between numerous instruments and requires continuous interaction and coordination with her or his assistants. Especially when the operating field is small and under magnification (such as in neurosurgical or other microsurgical procedures), the above time loss and added complexity and frustration are significant.

Central to all of the above actions is the ability of the surgeon to see clearly, hence the aspiration of blood, fluids, debris, fumes. This aspiration is currently done by a tubular handheld probe connected with a negative pressure tubing/collector and held over a cotton patty in order to avoid continuous probe blockage and suction trauma to the tissue (cotton patties also irritate tissue). When blocked, the assistant nurse provides a new probe connected to the tubing and cleans the previous one by injecting liquid inside it with a syringe. Syringes held by the surgeon or assistants are used for surgical field irrigation as to assist visibility, as well as to lower the overall contamination risk to tissue and to lower the risk of tissue damage by the heat produced when using electrosurgical devices.

An important factor in the operative time is also the frequent need to hold tissue in an atraumatic way with a forceps or to cut with scissors, since during cutting an assistant's coordinated irrigation and aspiration must keep the surgeon's view clear.

Blunt tissue dissection is a further action which consumes a large proportion of time in most surgeries and has not changed significantly in centuries. Blunt dissection describes the careful separation of tissues along tissue planes by either fingers or convenient blunt instruments during many diverse surgical procedures.

The control of blood loss is another time-consuming high priority during surgery so as to avoid or minimize the necessity of introducing foreign blood or blood products into a patient. Coagulation of bleeding blood vessels is usually done with a bipolar electrosurgical forceps through application of a high-frequency (radio frequency) alternating polarity, electrical current to the tissue, because when such forceps are used, only a limited amount of tissue is included in the circuit formed by the electrodes, reducing the risk of unwanted effects and the extent of thermal damage to the tissue.

However, these bipolar forceps do not have the ability to effectively cut tissue, requiring a surgeon needing to cut coagulated tissue to select another instrument (like scissors) to complete the dissection. Existing surgical devices therefore each provide limited functions and need to be frequently changed.

US 2013/0066317 attempts to solve this problem by providing a bipolar electrosurgical forceps comprising an active and return electrode on distal end portions of the forceps' legs, wherein one of the legs comprises a discharge aperture for irrigation fluid while the return electrode comprises an aspiration aperture. The position of the forceps legs and the electrical energy applied to the electrodes is adjusted to provide dissection or coagulation to the tissue.

This may save some time as it incorporates the electrosurgical forceps, discharge means and aspiration means into the same instrument. However, US 2013/0066317 is silent about how the functions of the instrument are controlled to minimize the time required for changing from one mode of operation to another. Furthermore, the instrument provided by US 2013/0066317 suffers from the same limitations as traditional aspiration instruments which periodically become blocked during use and must be regularly changed by an assistant for cleaning. In this case, blockage of the aspiration means would require the whole instrument to be replaced during the surgery, causing further interruption to the surgeon's work. Due to the shape of the forceps tips taught in this document, they would be unsuitable for atraumatic tissue holding and blunt tissue dissection, for which different instruments would also need to be selected.

The provision of an improved surgical instrument which overcomes the limitations of the prior art is therefore desirable. In particular, the provision of a surgical instrument with the ability to hold tissue atraumatically, to bluntly dissect tissue and to perform aspiration with a reduced operating time and reduced interruption to the surgeon whilst maintaining high visibility would therefore be advantageous. The provision of a surgical instrument which is additionally able to irrigate, perform fine dissection of tissue, and perform a variety of electrosurgical techniques on tissue while allowing the surgeon to efficiently control these processes with no assistant's help, would therefore also be advantageous.

DESCRIPTION OF THE INVENTION

A multifunctional surgical instrument is provided by the invention. The multifunctional surgical instrument comprises a proximal portion and two legs, wherein each leg comprises a distal end. A default position of the multifunctional surgical instrument is an open position. In the open position, the distal ends of the legs do not meet. There is preferably a 2-3 cm gap between the distal ends of the legs by default. Each leg comprises an aspiration half-channel. The proximal portion comprises an aspiration connection and at least one of the distal ends of the legs comprises at least one aspiration orifice. The two half-channels are configured to form an air-tight and water-tight aspiration channel connecting the at least one aspiration orifice to the aspiration connection when the multifunctional surgical instrument is in a fully closed position and are configured to open the aspiration channel when the multifunctional surgical instrument is not in the fully closed position, such that aspiration is stopped. The fully closed position may be achieved when a surgeon firmly presses the two legs together and the open position may be achieved when the surgeon releases some pressure from the instrument's legs. This allows the surgeon to immediately stop aspiration by releasing pressure, thus safeguarding tissue that is not to be aspirated.

The aspiration half-channels may be tapered to a blunt atraumatic point at a distal end of the instrument's legs when in the fully closed position. This may be used for blunt tissue dissection.

The aspiration half-channels may comprise a transparent material configured to allow visualization inside the half-channels.

The multifunctional surgical instrument may comprise a plurality of orifices at its distal end, wherein the size of the orifices is configured to limit the entry of tissue into the aspiration channel.

At least one leg of the multifunctional surgical instrument may further comprise at least one surgical probe element. This may be any elongated or substantially tubular element configured to interact surgically with tissue at its distal end. The one or more additional surgical probe elements may be configured to use energy supplied to it in any suitable form to perform coagulation, desiccation, fulguration, vaporization or any combination thereof. Energy may be supplied for example in the form of alternating electric current.

The surgical probe element may be a means for performing coagulation, desiccation, fulguration or vaporization.

The surgical probe element may be configured for carrying out one or more of the following surgical techniques, including but not limited to: bipolar electrosurgery, monopolar electrosurgery, electrocautery, hyfrecator type electrosurgery, cryosurgery, argon plasma surgery, laser surgery, ultrasonic surgery (harmonic scalpel), microwave surgery.

Each leg of the instrument may comprise a surgical probe element wherein the surgical probe element comprises an electrode of a bipolar electrosurgical forceps.

The aspiration half-channels may comprise an electrically insulating material and may house the at least one surgical probe element, for example the electrodes. The aspiration half-channels may additionally or alternatively house irrigation channels. When an irrigation channel is housed inside the aspiration channel, the former may be used to clear blockage to the one or more aspiration orifices. This may be done by activating the irrigation, e.g. via a foot pedal and a pump, while keeping the instrument in a fully closed position. The pressure build-up inside the aspiration channel may quickly expel the material blockage outward without interruption to surgery.

The electrodes may comprise blunt atraumatic distal ends wherein each of the blunt atraumatic distal ends may comprise an inner face shaped to hold and/or electrosurgically coagulate, desiccate, vaporise and/or fulgurate tissue.

The multifunctional surgical instrument may further comprise at least one irrigation channel configured to allow the flow of an irrigation fluid from an irrigation connection at the proximal portion to an irrigation orifice at a distal end of the irrigation channel. The irrigation fluid may be used to cool the surgical instrument and to irrigate the surgical wound. The irrigation fluid may also be used to clear the at least one aspiration orifice when this is blocked by forcing material out of the orifice. The irrigation channel may be incorporated in the surgical instrument independently of the presence of electrodes or any other surgical probe element. One or both of the aspiration half-channels may house an irrigation channel.

The irrigation orifice may be positioned closer to the proximal portion of the instrument than the blunt atraumatic distal ends such that, when irrigation is activated, irrigation fluid tends to flow towards at least one of the blunt atraumatic distal ends. This may be used for cooling the blunt atraumatic distal ends during electrosurgery.

The blunt atraumatic ends may further comprise an outer face which is convex and substantially rounded in shape. The outer face may have a sleek surface. This may be used for blunt tissue dissection.

The electrodes may further comprise an opposing blade on an inner face of each electrode. The opposing blades may be positioned at a distance, preferably up to 5 mm, more preferably up to 3 mm, from the blunt atraumatic ends of the electrodes such that the blades do not interfere with tissue holding and electrosurgical techniques. The blades may be housed in the transparent aspiration half-channels such that the surgeon can see the cutting process clearly from various sides.

The aspiration connection of the surgical instrument may be configured to couple the aspiration channel to an external suction mechanism.

The proximal portion of the surgical instrument may further comprise: energy connections configured to couple each surgical probe element to a respective energy source, preferably an electrical connection connecting each electrode to an electrical source, and a fluid-tight connection configured to couple the at least one irrigation channel to an irrigation fluid source.

The energy source may be configured to supply energy in any form suitable for performing coagulation, desiccation, fulguration or vaporization using the electrical probe element. At least one energy source may be configured to supply energy to one of the following forms: microwaves, alternating electric current, direct electric current, laser beams, ultrasound waves, temperature alterations, vibration.

The connections may be connected to a control unit to allow independent switching on/off of electrical current, irrigation fluid flow and aspiration and to control the value of one or more of the following parameters: voltage, current, frequency, wave form, intensity, temperature, irrigation fluid flow rate, irrigation fluid pressure, aspiration rate and the negative pressure of aspiration.

The control unit may comprise a first foot pedal for control of the at least one surgical probe element, a second foot pedal for the control of irrigation and a third foot pedal for the control of aspiration.

The control unit may additionally or alternatively comprise a first manual switch for control of the at least one surgical probe element, a second manual switch for the control of irrigation and a third manual switch for the control of aspiration. Any other hand or foot activated controls may also be used, including but not limited to: dials, wheels, push-bars or levers. The same or additional controls may be configured for use by the surgeon or an assistant. The controls may be conveniently placed within reach of the surgeon and/or the assistant.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DESCRIPTION OF THE PREFERRED EMBODIMENTS OF THE INVENTION

Figure 1:
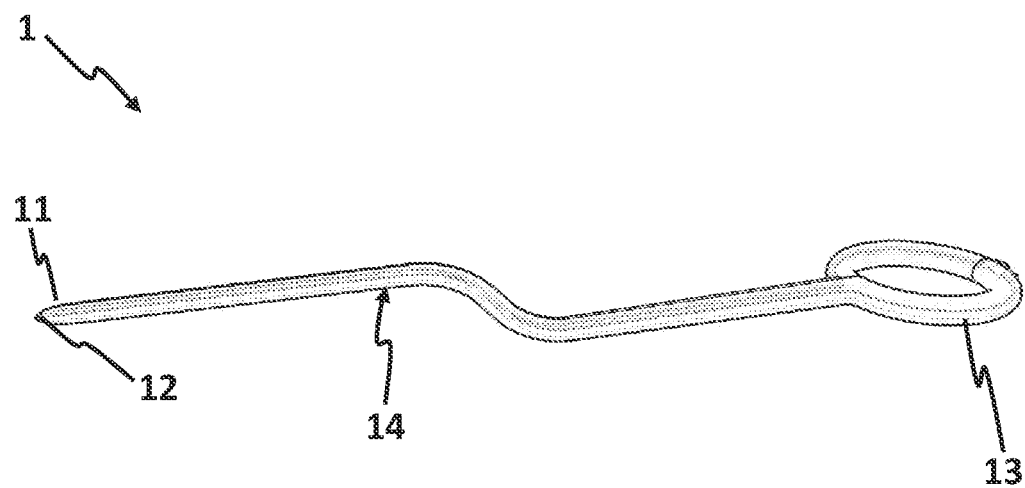
FIG. 1 is a perspective view of a multifunctional surgical instrument according to a first preferred embodiment of the invention.

FIG. 1 shows a multifunctional surgical instrument 1 according to a first preferred embodiment of the invention. The multifunctional surgical instrument 1 comprises two distal ends 11, 12 and a proximal portion 13. The proximal portion 13 may be shaped such as to bias the distal ends 11, 12 of the instrument away from each other. The instrument may be shaped like a bayonet-style forceps. The distal ends of the instrument are the ends of two legs 14 which may have a discontinuous shape. Due to the biasing, the user of the instrument should therefore apply pressure to bring the two legs together and release this pressure to allow the instrument to return to its default open position wherein the distal ends do not meet. The proximal portion 13 may be configured to rest on the user's hand during use. The user may open and close the instrument by respectively applying and releasing pressure to the proximal part of the instrument's legs before the bayonet deviation.

The multifunctional surgical instrument of the first preferred embodiment comprises three main components, which will later be described individually: a pair of electrodes, an irrigation channel and an aspiration channel. Each of these is connected, via wires or tubes to a control unit. The connections may be mounted on the proximal portion 13 of the instrument. The control unit may, for example, comprise a foot pedal control system whereby pressing down on a corresponding pedal activates the electrodes, the irrigation process or the aspiration process.

Figure 2:
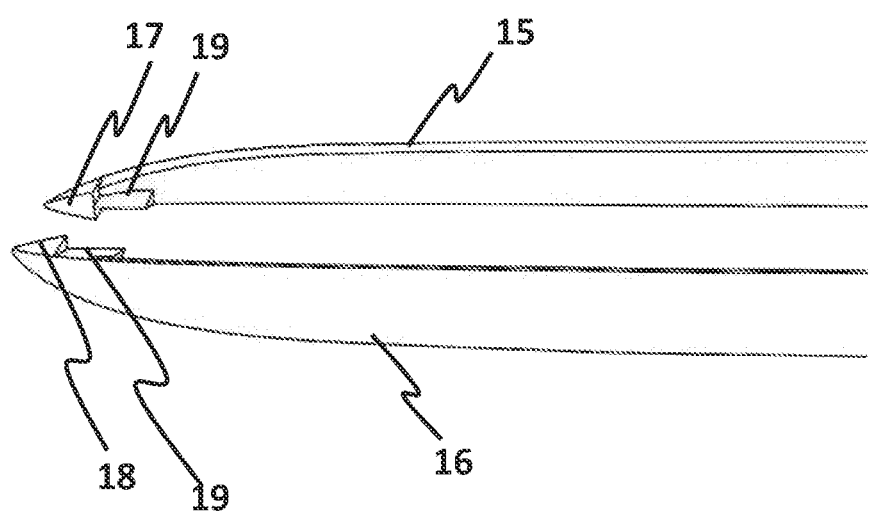
FIG. 2 is a perspective view of distal ends of the electrodes of the electrosurgical forceps in an open position, isolated from the other components of the instrument of the first preferred embodiment.

FIG. 2 shows the electrodes 15, 16 in isolation. The electrodes 15, 16 form a bipolar electrosurgical forceps. Preferably, both electrodes are active electrodes as is more usually the case in electrosurgical forceps. Alternatively, one of the electrodes may be an active electrode while the other may be a dispersive electrode.

The electrodes may comprise atraumatic ends 17, 18 which each have a substantially flat interior face and a substantially rounded and sleek (smooth and streamlined) exterior face such that the atraumatic ends may be used for tissue holding and blunt tissue dissection. The exterior face of the atraumatic ends may be very smooth or polished. On an interior face of each electrode and at a distance, for example of 2-3 mm from the ends, is an opposing blade 19. The pair of opposing blades 19 forms a scissor suitable for finely dissecting tissue. As an example, the atraumatic ends 17, 18 may first be used to select and electrosurgically coagulate a blood vessel before the blades 19 are used to cut the same blood vessel.

Figure 3:
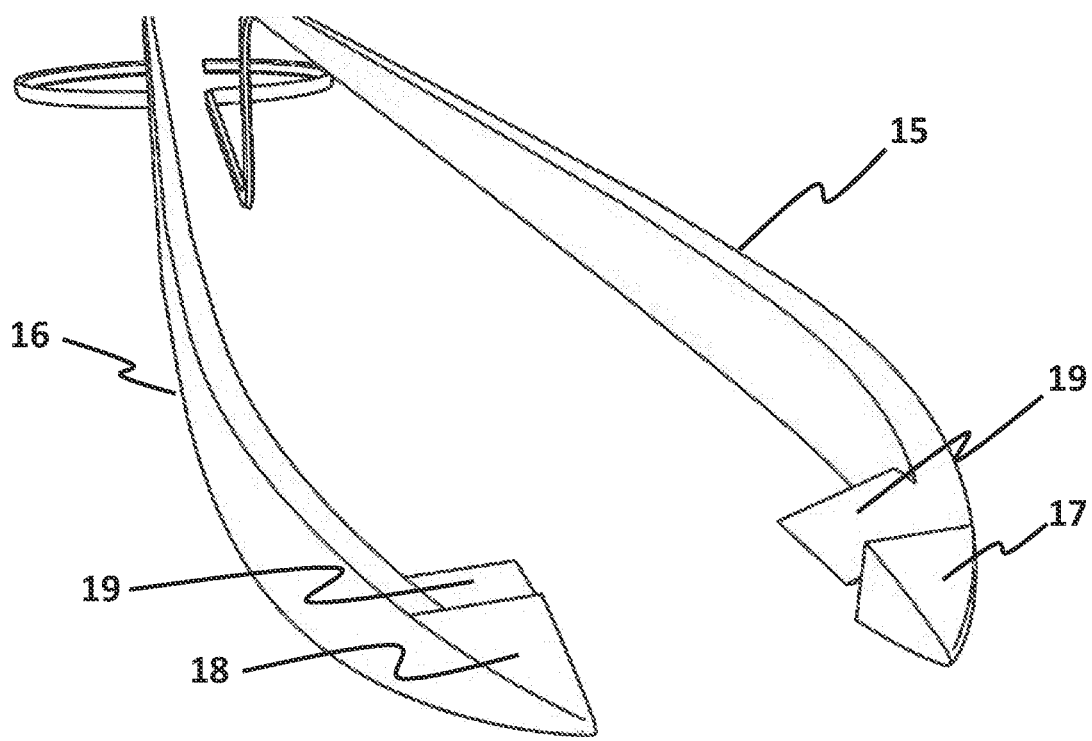
FIG. 3 is a perspective view of the distal ends of the electrodes of the first preferred embodiment in an open position.
Figure 4:
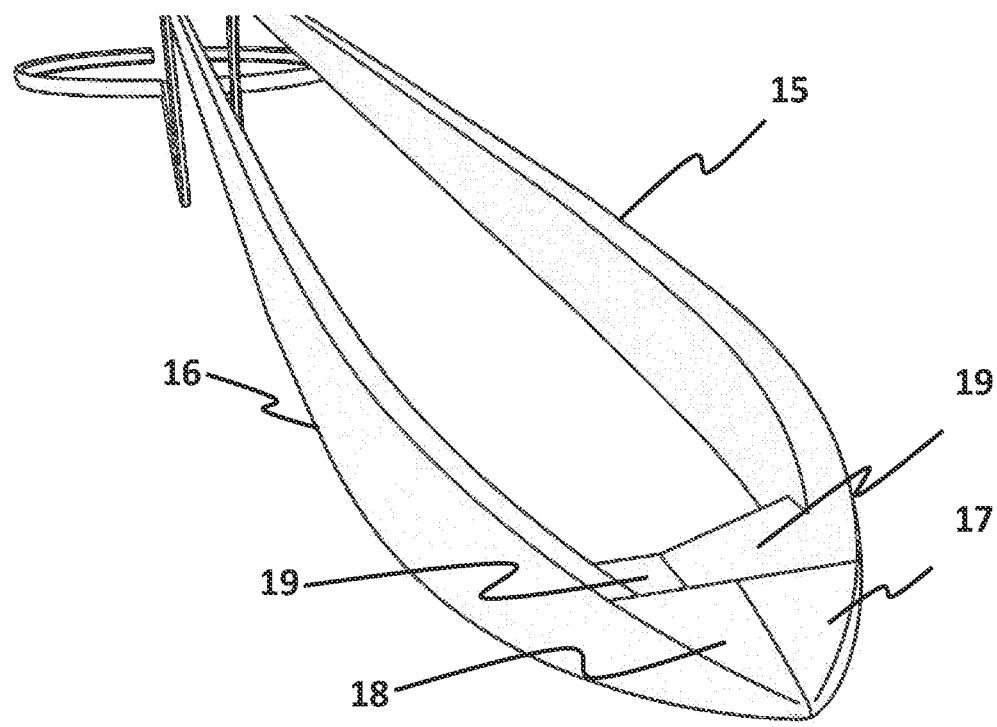
FIG. 4 is a perspective view of the distal ends of the electrodes of the first preferred embodiment in a closed position.

FIGS. 3 and 4 are front views of the electrodes 15, 16 in an open and closed position respectively. The figures show that the blades overlap slightly to cause a shearing action while the atraumatic ends 17, 18 fit tightly together when the position is closed.

Figure 5:
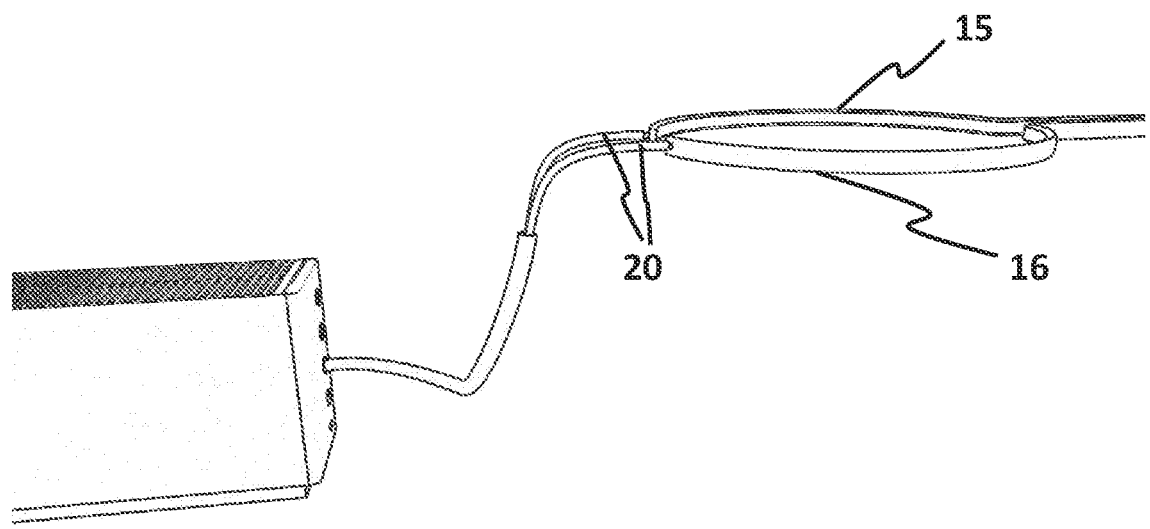
FIG. 5 is a perspective view of a proximal portion of the electrodes of the first preferred embodiment and part of a control system.

FIG. 5 shows the proximal ends of the electrodes 15, 16. These are assembled as part of the multifunctional surgical instrument of the first preferred embodiment such that the proximal ends remain separate from each other and each end comprises an electrical connection 20 which is coupled to the control unit. The control unit may supply electrical current to the active electrodes as well as controlling the current flow and switching this on or off. Alternatively, the connection 20 may supply any other energy form such as ultrasonic waves or laser beams. Preferably, the control unit includes a foot pedal control for the electrodes whereby pressing the foot pedal activates and/or increases the current flow and releasing the foot pedal stops the current. Alternatives such as hand switches may be used and additional electrosurgical parameters may be controlled.

Figure 6:
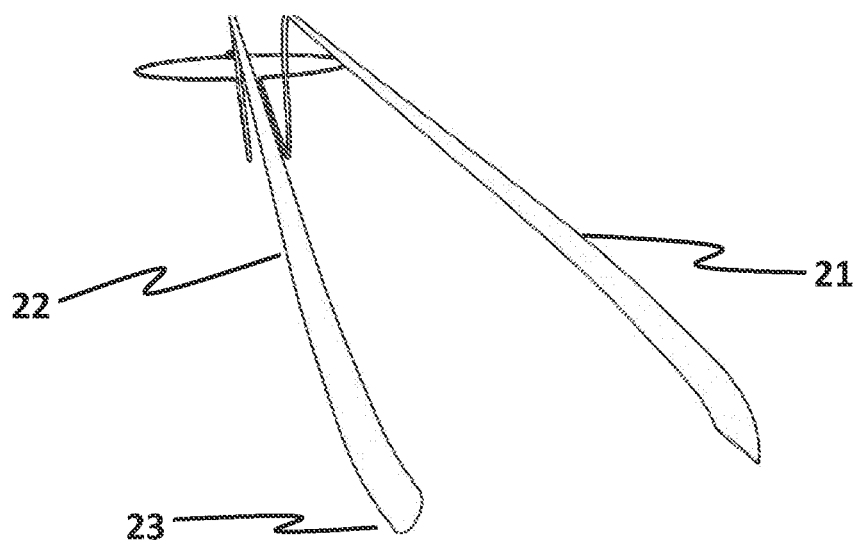
FIG. 6 is a perspective view of distal ends of an irrigation channel isolated from the other components of the instrument of the first preferred embodiment.

FIG. 6 is a front view of the irrigation channels 21, 22. These may be assembled approximately in parallel to the electrodes 15, 16 in the multifunctional surgical instrument. The irrigation channels comprise orifices 23 at their distal ends through which the irrigation fluid may exit. This may, for example, be an isotonic saline solution.

Figure 7:
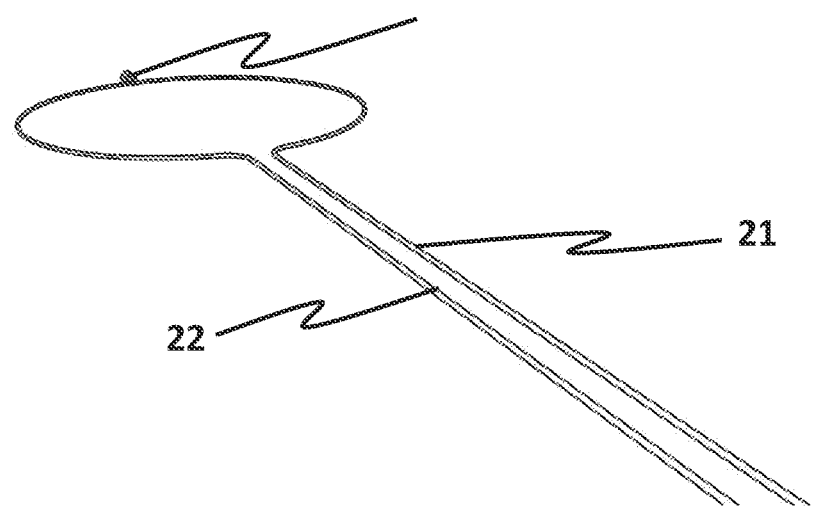
FIG. 7 is a perspective view of the irrigation channel of the first preferred embodiment including the proximal portion but not the distal ends.
Figure 8:
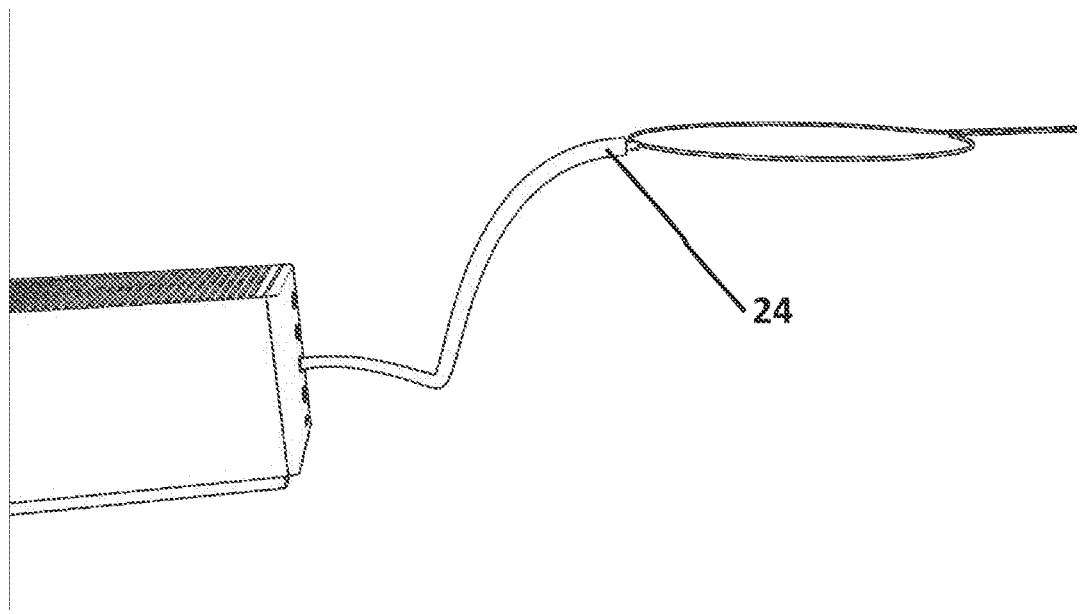
FIG. 8 is a further perspective view of the proximal portion of the irrigation channel of the first preferred embodiment and part of a control system.

FIGS. 7 and 8 show the proximal portions of the irrigation channels 21, 22. The channels are continuous with each other and comprise a fluid connection 24 which may be coupled to a fluid source, a pump and a control unit, which may comprise a foot pedal to switch the flow on and off and control the flow rate or any other flow parameter.

Figure 9:
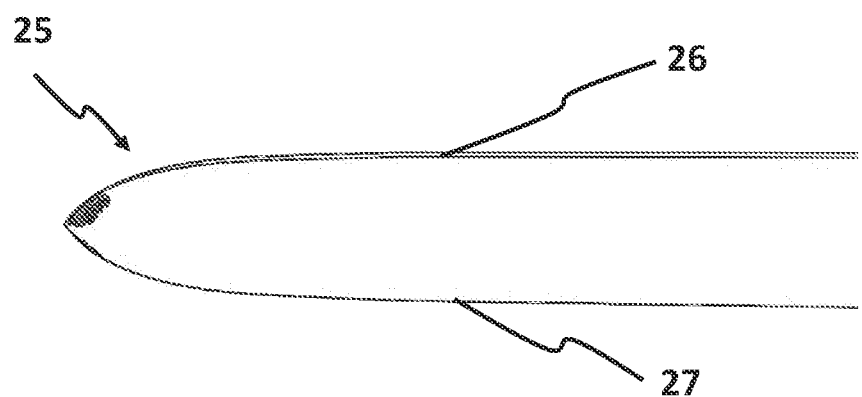
FIG. 9 is a side view of a distal end of the aspiration channel in a closed position, isolated from the other components of the instrument of the first preferred embodiment.

FIG. 9 shows a side view of the aspiration channel 25. This comprises two half-channels 26, 27 which only form the air-tight channel 25 when the multifunctional surgical instrument is in the fully closed position and the two half-channels form a seal along their longitudinal edges. The half-channels 26, 27 may be configured to house the irrigation channels and electrodes inside their hollow portions. The half-channels 26, 27 may be configured to be electrically insulating. More preferably, the half-channels 26, 27 may be made of a transparent material to allow visualization of the internal components and tissue during use. More preferably, the half-channels may be made of transparent surgical grade polycarbonate which is both electrically insulating and transparent.

Figure 10:
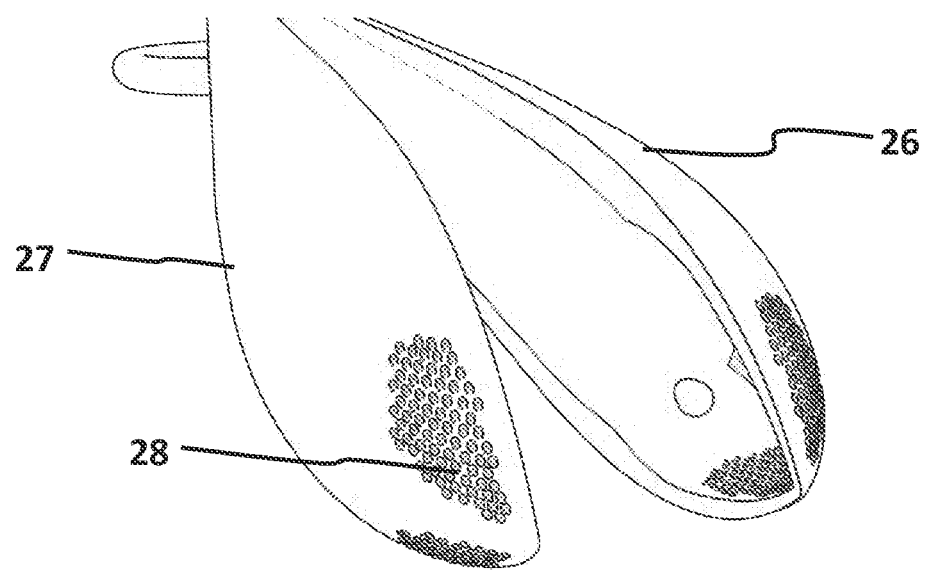
FIG. 10 is a front view of the aspiration channel of the first preferred embodiment in an open position.

FIG. 10 shows a front view of the half-channels 26, 27 in an open position. The distal ends of the half-channels 26, 27 may comprise a plurality of fine orifices 28, for example 0.1-0.2 mm in diameter, through which liquids or gases may be aspirated into the channel. The size and density of the orifices may be such that unwanted aspiration of tissue is avoided as tissue is filtered out of the channel 25. The orifices 28 may function as an alternative to the cotton patty through which aspiration is traditionally carried out.

Figure 11:
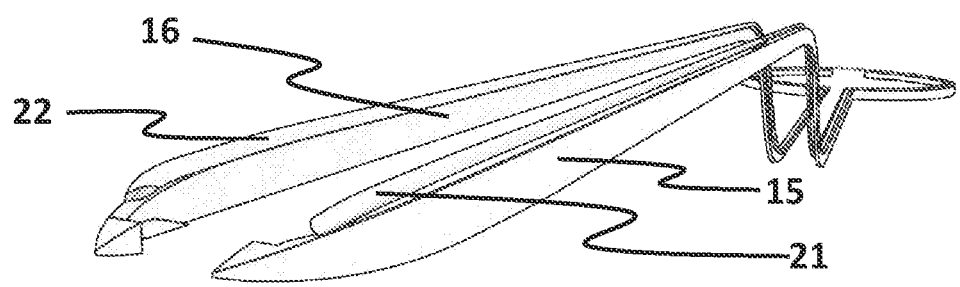
FIG. 11 is a perspective view of the partially assembled instrument of the first preferred embodiment including the electrodes and irrigation channel.

FIG. 11 shows a partially assembled instrument including the positions of the irrigation channels 21, 22 and electrodes 15, 16. The irrigation orifices 23 are positioned slightly closer to the proximal portion of the instrument such that irrigation may be carried out during an electrosurgical process whereby fluid is pumped or drips down towards the atraumatic ends 17, 18 of the electrodes. For example, the irrigation orifices 23 may be at least 0.1 mm away from the atraumatic ends 17, 18.

Figure 12:
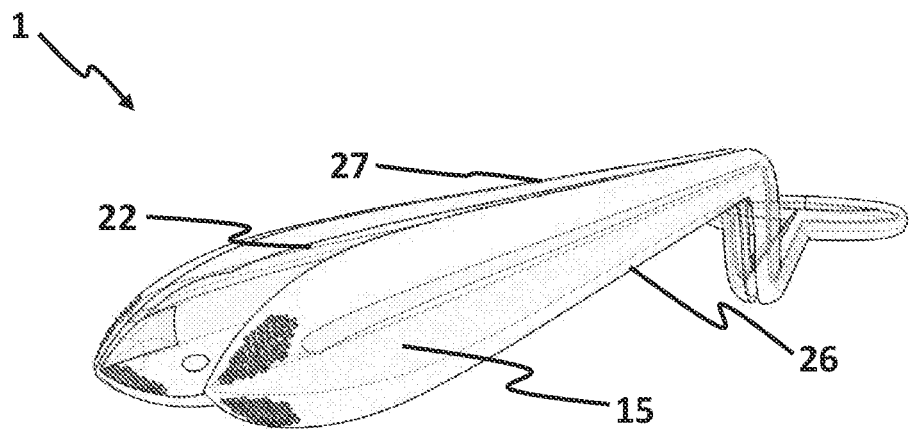
FIG. 12 is a perspective view of the distal ends of the fully assembled instrument of the first preferred embodiment.

FIG. 12 shows the fully assembled multifunctional surgical instrument 1 of the first preferred embodiment wherein the irrigation channels 21, 22 and electrodes 15, 16 are housed inside respective aspiration half-channels 26, 27.

Figure 13:
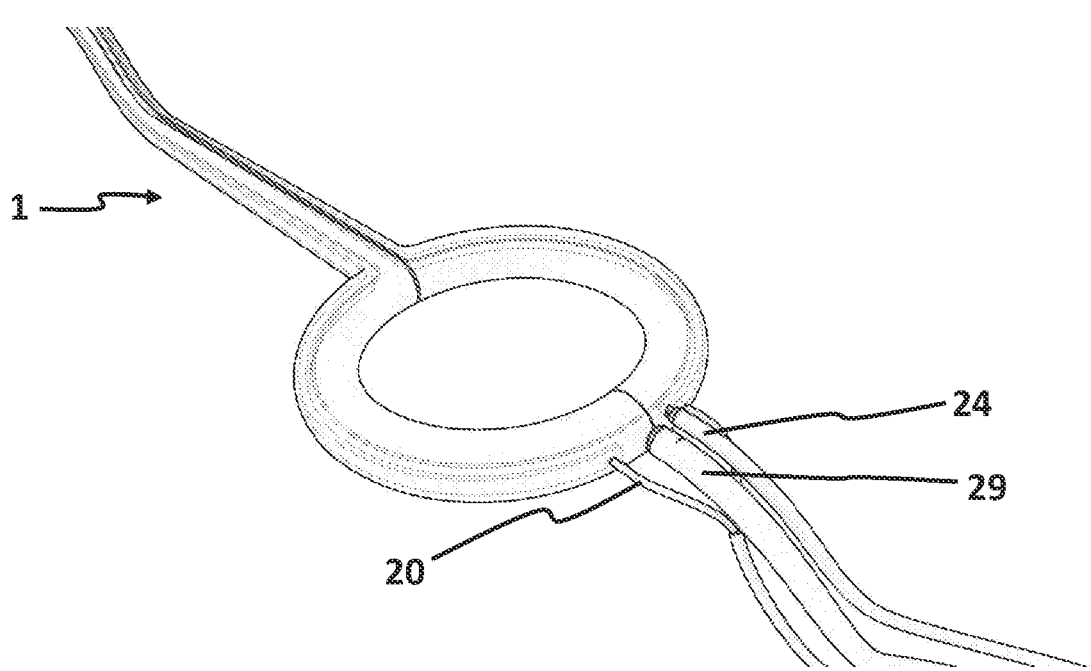
FIG. 13 is a perspective view of the proximal portion of the fully assembled instrument of the first preferred embodiment.

FIG. 13 shows the connections at the proximal portion of the multifunctional surgical instrument 1. These include electrical connections 20, fluid connection 24 and an air connection 29. This figure also shows that the aspiration channel is a continuous fluid-tight tube housing the irrigation channels and electrodes at the proximal portion of the multifunctional surgical instrument and is split longitudinally along the legs of the instrument.

Figure 14:
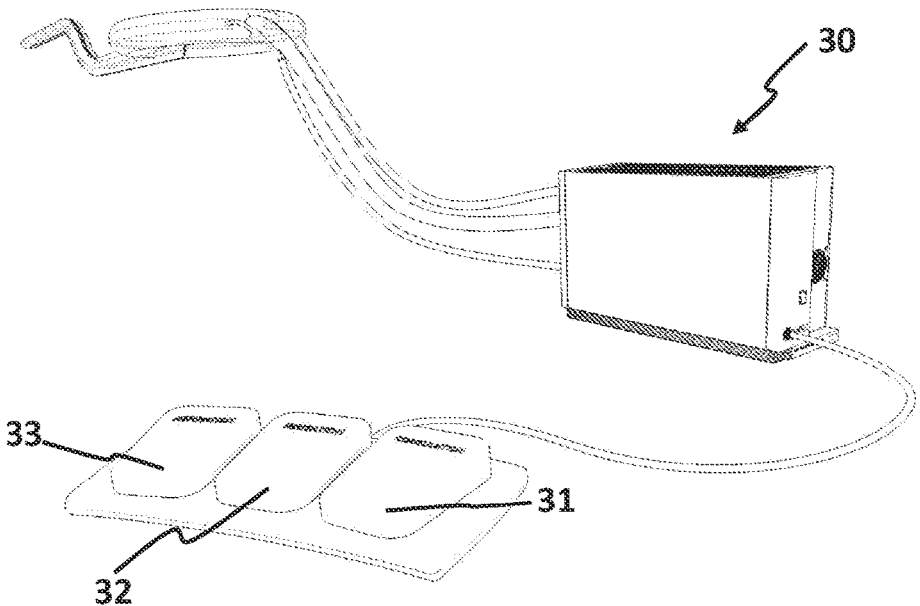
FIG. 14 is an illustration of a control system connected to the instrument according to the first preferred embodiment of the invention.

FIG. 14 illustrates an example of a control unit 30 including foot pedals 31, 32, 33. These may be used as described above to control the coagulation, irrigation and aspiration respectively. In the case of aspiration, releasing the foot pedal 33 may stop aspiration. In addition, releasing the pressure applied to the instruments' legs such that they return to an open position would also allow aspiration to be immediately stopped, safeguarding tissue.

FIGS. 15 to 27 illustrate optional steps in which the multifunctional surgical instrument 1 of the first and a second preferred embodiment may be used in surgery. These may be carried out in any order and any steps may be omitted or repeated as necessary.

Figure 15:
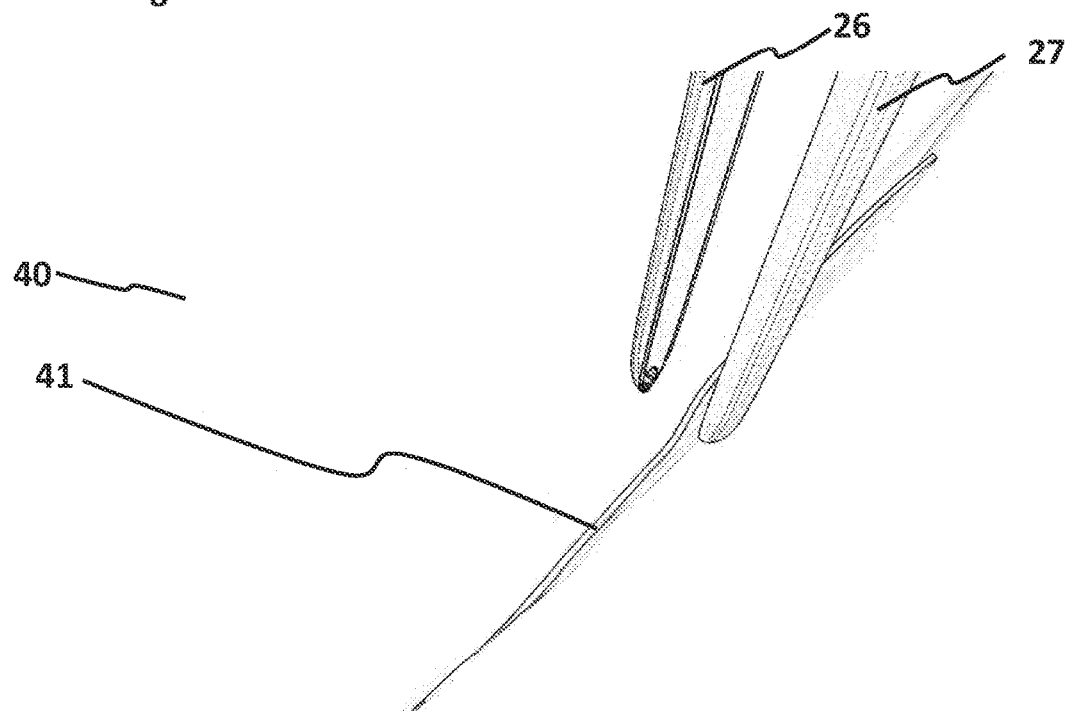
FIG. 15 is an illustration of blunt tissue dissection using the aspiration half-channels of the multifunctional surgical instrument according to a second preferred embodiment.

FIG. 15 illustrates use of the multifunctional surgical instrument according to second preferred embodiment for blunt dissection in an open wound. The instrument comprises the transparent aspiration half-channels 26, 27 which taper towards a distal point and comprises fine orifices close to the distal ends of the half-tubes. This embodiment of the invention does not include electrodes or irrigation channels. The half-channels 26, 27 are used to manipulate tissue 40 in a surgical wound in order to access a blood vessel 41. The aspiration is not yet activated and the half-channels are held at an intermediate position between being open and closed, whilst being inserted into the wound.

Figure 16:
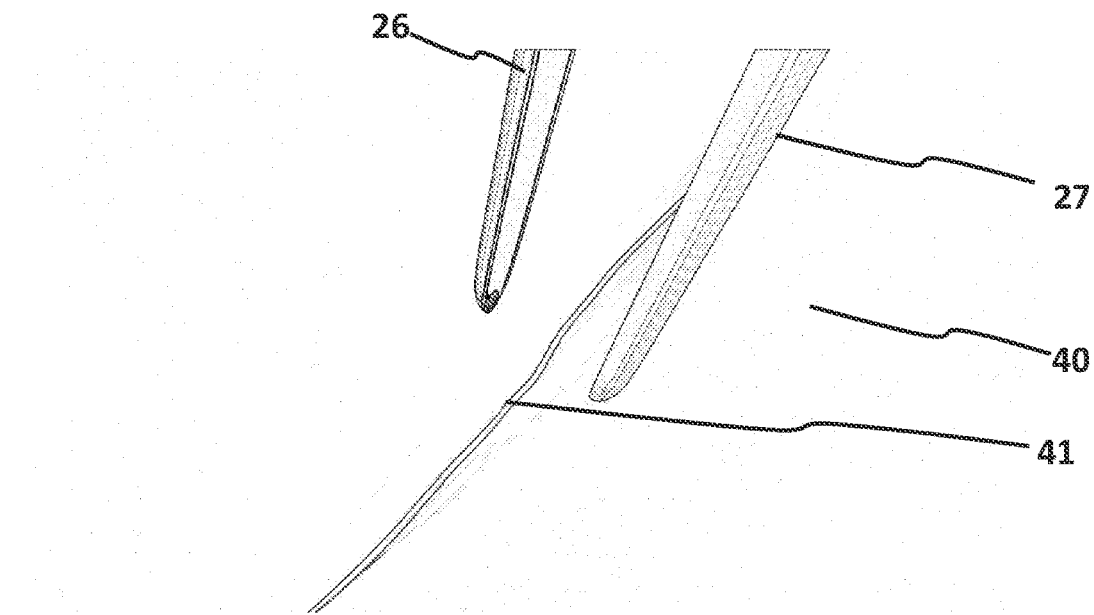
FIG. 16 is a further illustration of the blunt tissue dissection using the multifunctional surgical instrument of the second preferred embodiment.

FIG. 16 illustrates a step where the half-channels 26, 27 are used to open a portion of tissue 40 revealing the blood vessel 41. The user releases pressure from the instruments' legs adjacent to the proximal portion of the instrument to move these towards an open position. The rounded exterior surfaces of the half-channels 26, 27 fulfill this function whilst minimizing unwanted tissue damage.

Figure 17:
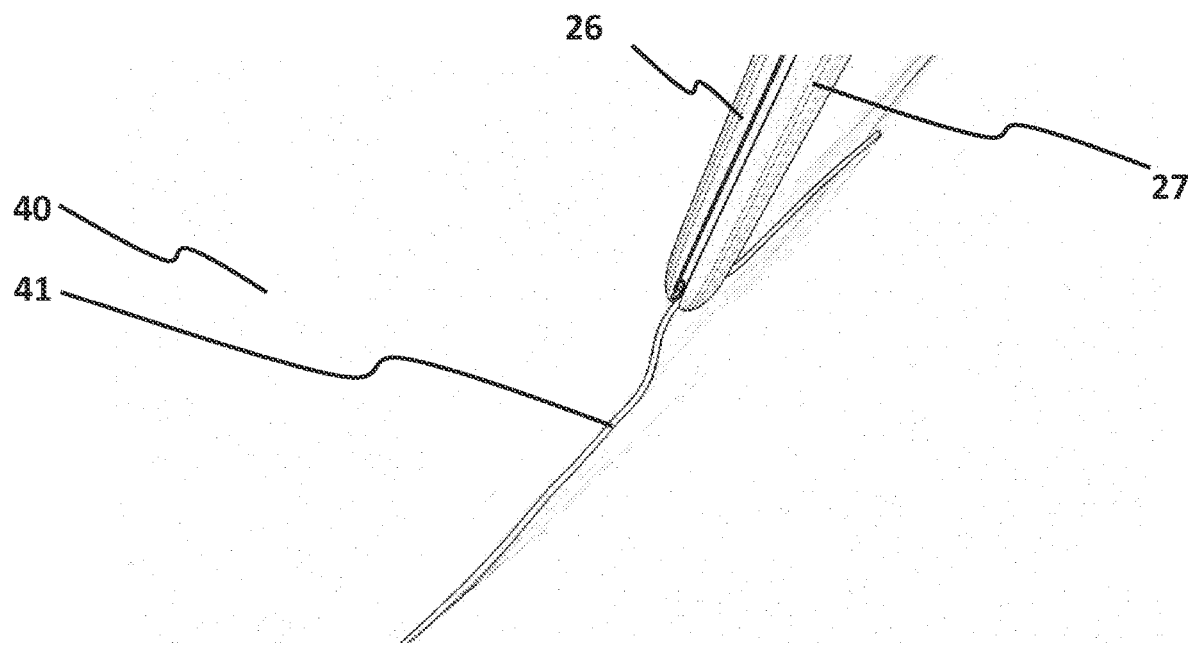
FIG. 17 is an illustration of atraumatically holding a blood vessel using the multifunctional surgical instrument of the second preferred embodiment.

FIG. 17 illustrates a step where the bluntly pointed distal ends of the half-channels 26, 27 are used to hold and manipulate the blood vessel 41 on which the desired electrosurgery is to be carried out.

Figure 18:
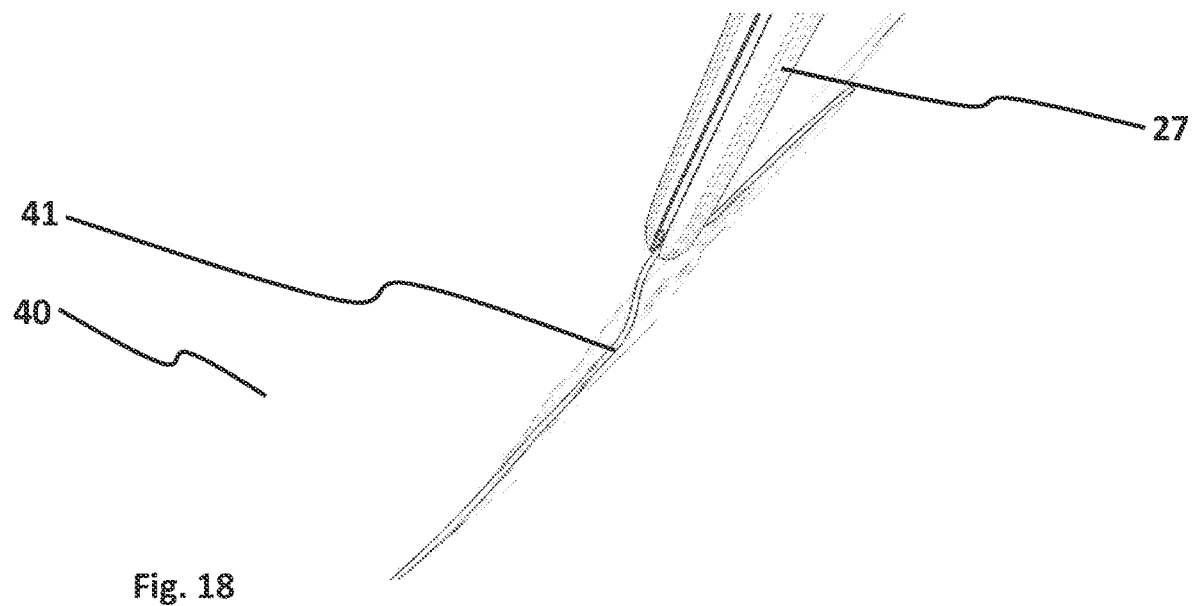
FIG. 18 is an illustration of the surgical wound filling with a fluid.

FIG. 18 illustrates a further step where the instrument is used to hold the blood vessel 41. The wound may fill with blood or other fluids which are in use at this stage. This may reduce visibility of the tissues in the wound.

Figure 19:
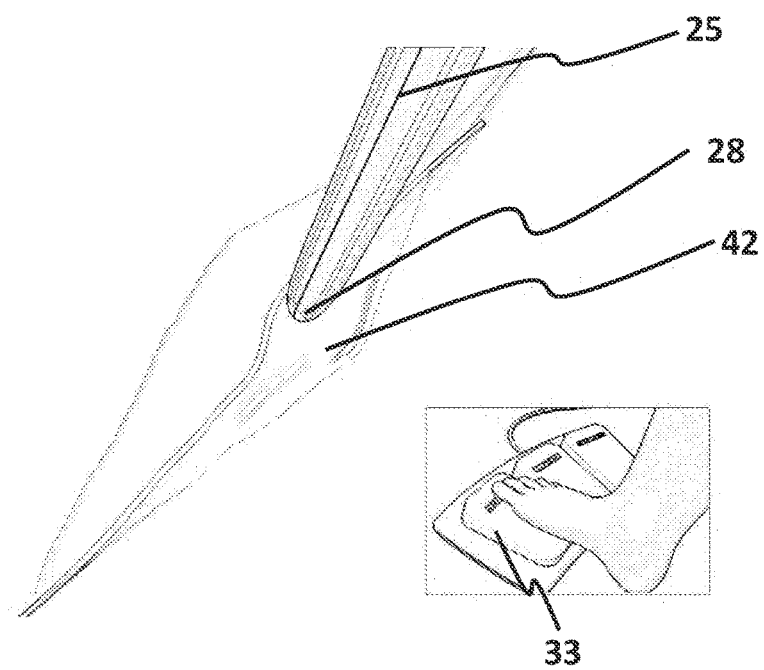
FIG. 19 is an illustration of a step of preparing to aspirate the fluid using the multifunctional surgical instrument of the second preferred embodiment.

FIG. 19 illustrates use of the multifunctional surgical instrument of the second preferred embodiment in a step of preparing to aspirate the excess liquid that has filled the wound. The user firmly applies manual pressure to bring the two legs together. The user then prepares to activate the aspiration, for example by placing a foot on a foot pedal 33 as shown in the figure.

Figure 20:
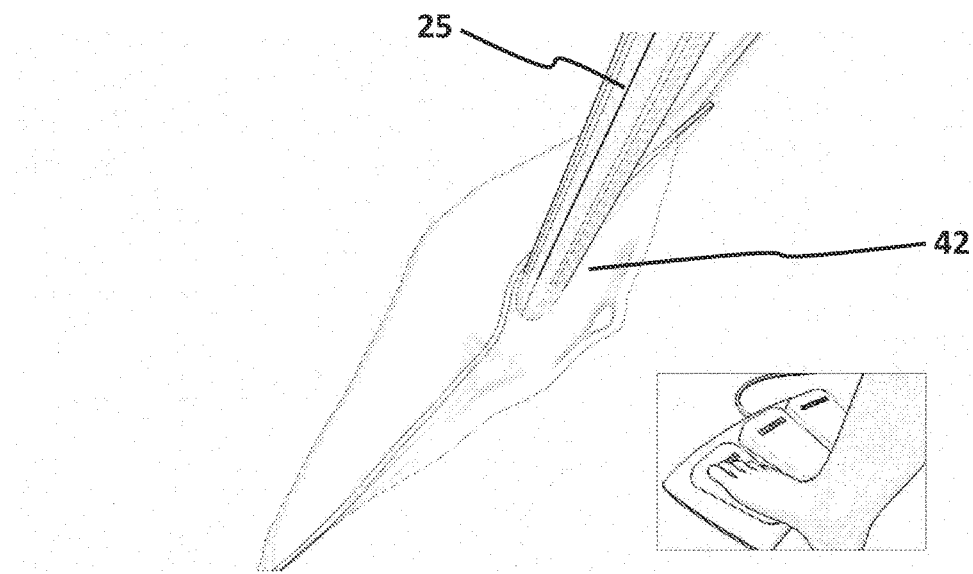
FIG. 20 is an illustration of a step of aspirating the fluid using the multifunctional surgical instrument of the second preferred embodiment.

FIG. 20 illustrates a step of aspirating the fluid 42 from the wound. The user inserts the closed aspiration channel 25 into the liquid which is to be aspirated, such that the fine orifices 28 are submerged in the liquid. The user then presses down with their foot on the aspiration foot pedal. A pump in the control unit 30 (not shown) may create a negative pressure in the tubes continuous with the channel 25. This aspirates the fluid into the transparent channel 25 and through the connection 29 (not shown) to a storage or drainage facility, preferably a collection bag.

Figure 21:
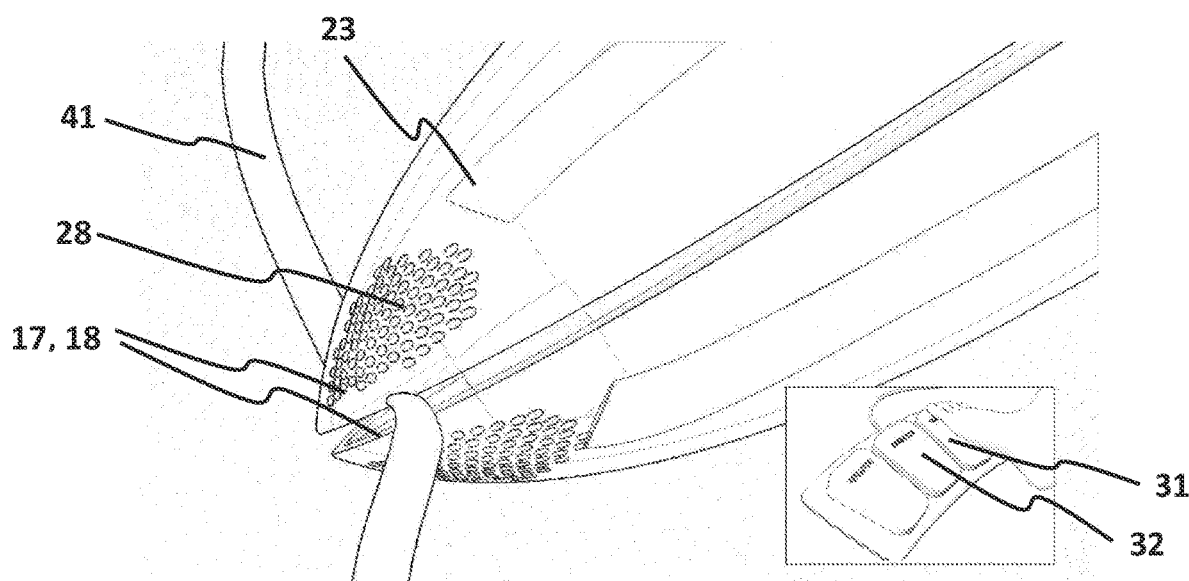
FIG. 21 is an enlarged view of holding a blood vessel in preparation for coagulation using the multifunctional surgical instrument according to the first preferred embodiment.

FIG. 21 illustrates use of the multifunctional surgical instrument according to the first preferred embodiment to hold the blood vessel 41 ready for coagulation, so as to seal it. In this embodiment, the instrument comprises electrodes and irrigation channels in the cavities of the aspiration half-channels, preferably embedded in the material of the half-channel walls. A foot pedal controls each of:

aspiration, coagulation and irrigation. The foot pedals 31, 32 for coagulation and irrigation are adjacent to each other such that the user can easily activate both simultaneously, as this is frequently required.

Figure 22:
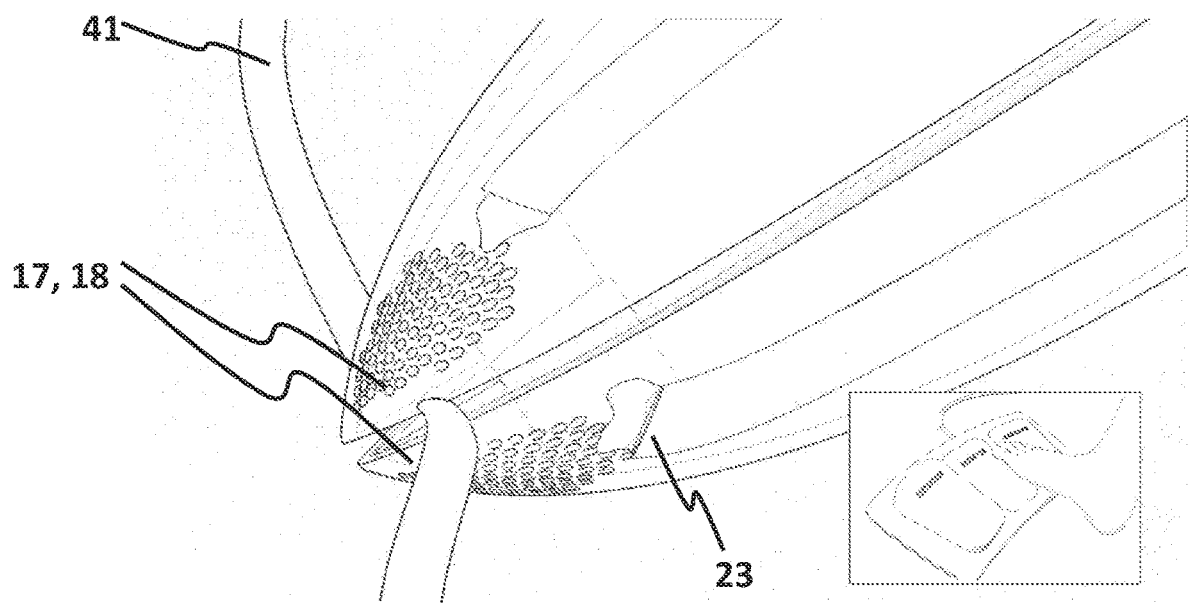
FIG. 22 is an illustration of a step of preparing to activate coagulation and irrigation using the multifunctional surgical instrument of the first preferred embodiment.

FIG. 22 illustrates the activation, using the foot pedals 31 and 32, of the coagulation and irrigation processes. Electrical current arcs between the atraumatic ends 17, 18 of the electrodes such that a portion of the blood vessel 41 is heated. The activation of the irrigation causes irrigation fluid to flow, for example using a pump, through the irrigation channels 21, 22 and out of the irrigation orifices 23. The irrigation fluid may be released mainly through the gap formed by the instrument's distal ends when these are not completely closed and/or through the fine orifices 28.

Figure 23:
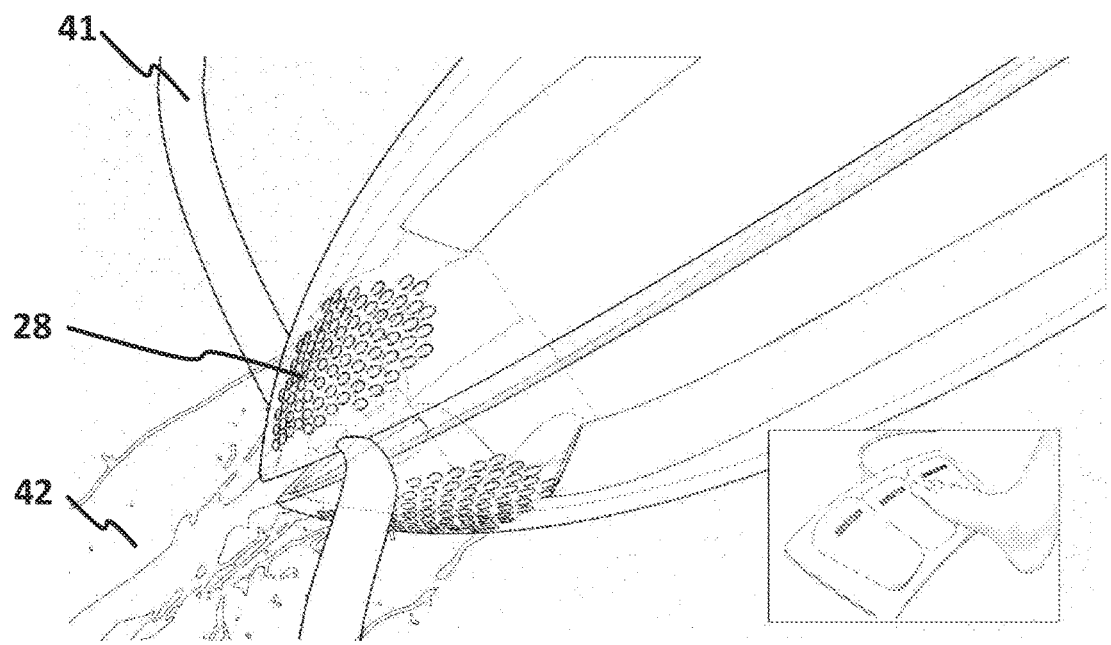
FIG. 23 is an illustration of a coagulation and irrigation step using the multifunctional surgical instrument of the first preferred embodiment.
Figure 24:
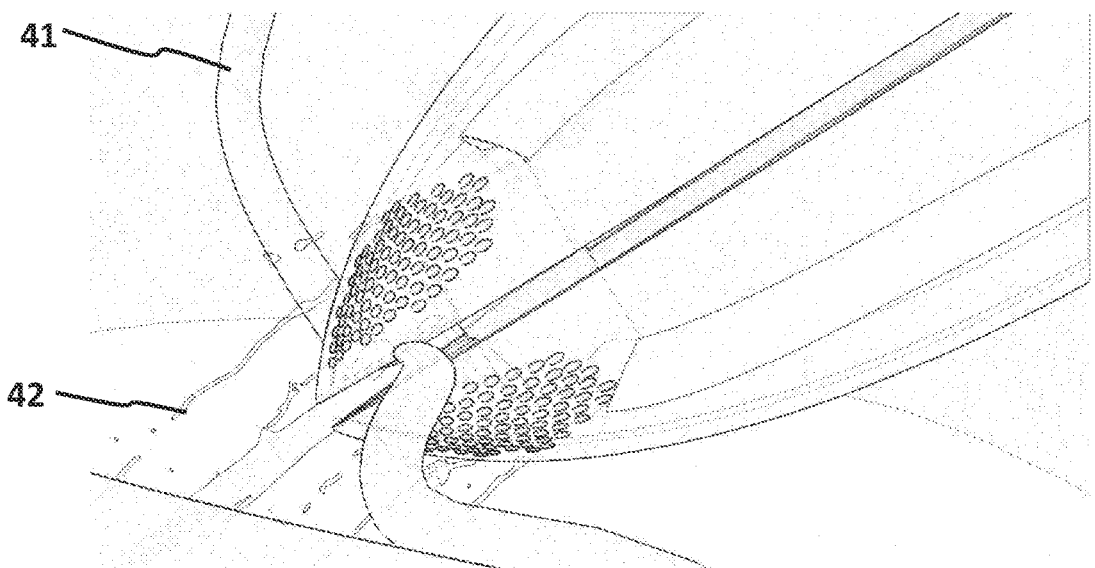
FIG. 24 is a further illustration of the coagulation and irrigation step using the multifunctional surgical instrument of the first preferred embodiment showing the wound filling with fluid.

FIGS. 23 and 24 illustrate a subsequent step in the electrosurgery wherein irrigation and coagulation are both activated and the surgical wound begins to fill with irrigation fluid 42. The irrigation fluid cools the atraumatic ends 17, 18 and the surrounding tissue during electrosurgery. This may prevent unwanted thermal damage to healthy tissues. The fluid 42 in the wound may also contain any fluids exuded by the wound. This may affect visibility of the tissue and would need to be aspirated.

Figure 25:
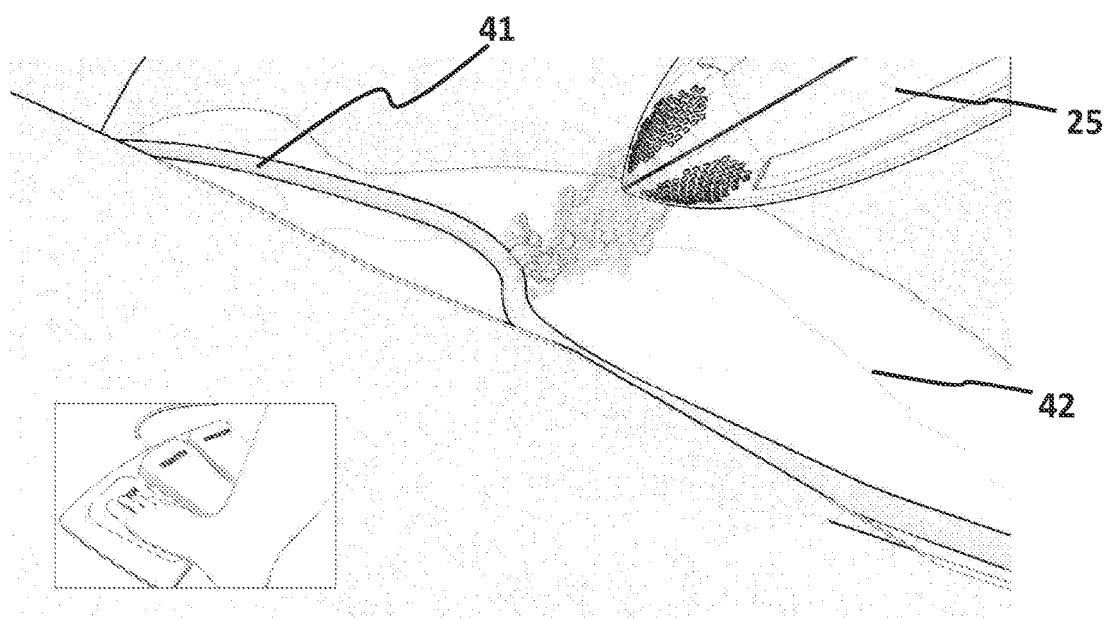
FIG. 25 is an illustration of a fume aspiration step using the multifunctional surgical instrument of the first preferred embodiment.

FIG. 25 illustrates a fume aspiration step. Fumes produced in electrosurgery are toxic and may obstruct visibility so are preferably aspirated before aspirating the fluid 42. At this stage, the instrument 1, again in a closed position, may be moved such that the orifices 28 are in close proximity to the sources of any fumes produced in the electrosurgical procedure.

Figure 26:
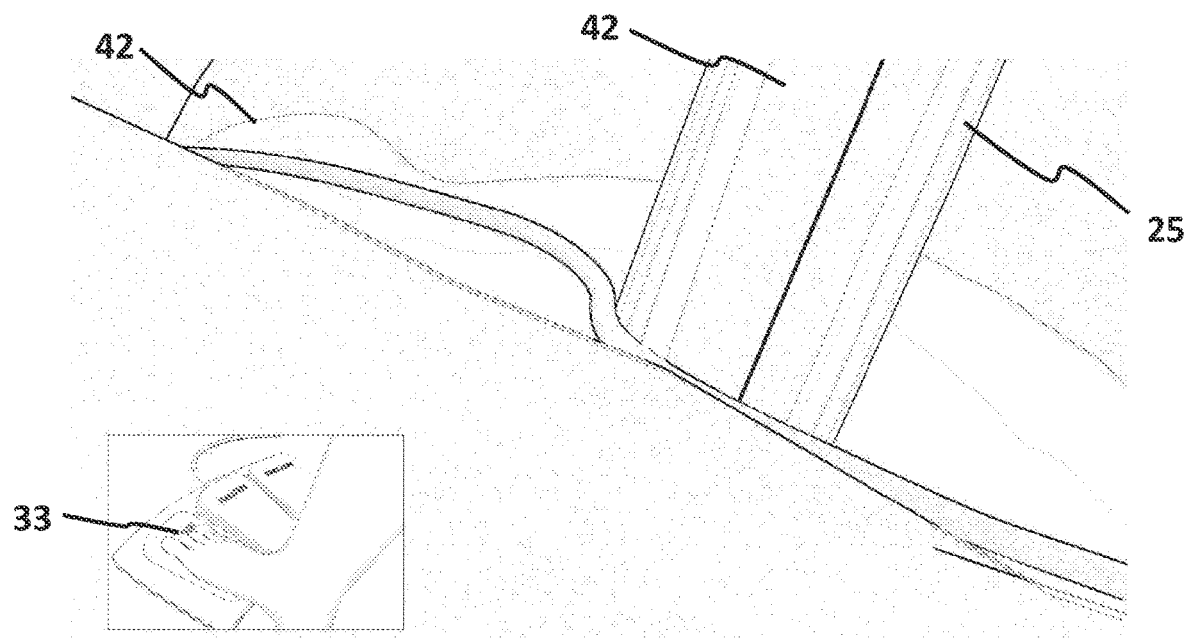
FIG. 26 is an illustration of a fluid aspiration step using the multifunctional surgical instrument of the first preferred embodiment.

FIG. 26 illustrates a liquid aspiration step. The instrument 1 is allowed to open to release the blood vessel 41. The instrument is moved and manual pressure is applied to the instrument's legs to move these to a fully closed position such that the two halves of the aspiration channel 25 meet and a water-tight and air-tight channel is formed. The instrument 1 is then inserted in the fluid. The user may activate the aspiration by pressing the foot pedal 33, causing material to be suctioned away from the wound. The orifices 28 of the aspiration channel are submerged in the fluid to be aspirated. These orifices prevent the aspiration of live tissue such that, where required, only the excess fluid 42 in the wound is removed. In addition, the pressure used to close the instrument may be released at any time to immediately stop aspiration. This prevents unwanted tissue damage. After both liquid and gas aspiration are complete and the surgical view is clear, the foot pedal controlling aspiration may be released.

Figure 27:
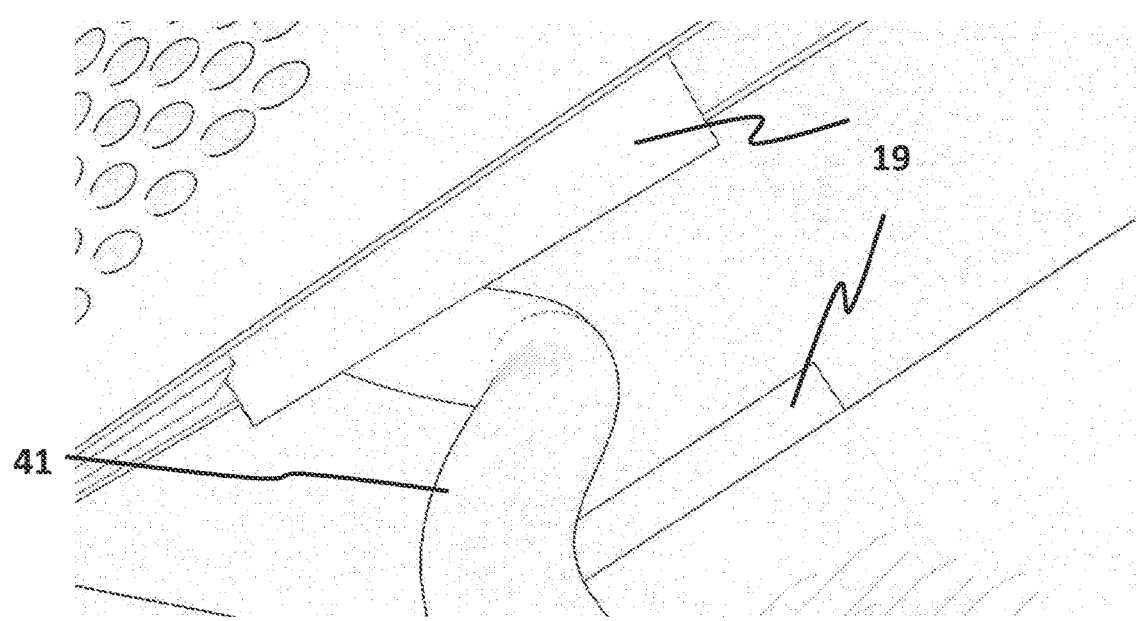
FIG. 27 is an illustration of a fine dissection step using the multifunctional surgical instrument of the first preferred embodiment.

FIG. 27 illustrates a cutting step. The instrument is allowed to open slightly by releasing some of the manual pressure. The opposing blades 19 of the instrument are then positioned on either side of the coagulated portion of the blood vessel and the legs are closed again to perform the shearing action. The transparent material of the aspiration channel allows the user to view the blood vessel 41 and the blades 19 such as to accurately position both and prevent unwanted tissue damage. The result is that the blood vessel may be cut without bleeding.

In a third preferred embodiment of the invention, not shown in the figures, the multifunctional surgical instrument comprises only a single macro orifice 28 at its distal end instead of a plurality of micro orifices. This single orifice may span one or both of the aspiration half-channels 26, 27.

In a fourth preferred embodiment of the invention, also not shown in the figures, the control system is configured to control the supply of energy in the form of electromagnetic waves in the microwave spectrum (300 MHz-300 GHz) to one or two probe elements installed in the cavity of one or both of the half-channels 26, 27 respectively such that the instrument is suitable for performing microwave coagulation.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A multifunctional surgical instrument for blunt dissection, comprising:
    a proximal portion with an aspiration connection, and a distal portion with two legs biased in an open position and operable to meet in a closed position;
    each leg comprising a bluntly pointed distal end operable for atraumatic tissue holding and having a substantially rounded, convex outer face and forming a blunt atraumatic distal end of the instrument when in a fully closed position;
    each leg further comprising an aspiration half-channel extending along a length thereof and configured to form an air-tight and water-tight aspiration channel when in the fully-closed position;
    the blunt atraumatic distal end of the instrument including at least one aspiration orifice on at least one of, or spanning both rounded, convex, outer faces forming the blunt atraumatic distal end, and located within 3 mm of the most distal point of the instrument, said at least one aspiration orifice fluidly coupled to the aspiration connection via the aspiration channel and having an opening size that is smaller than a cross-section size of the aspiration channel, such that the at least one aspiration orifice is operable to aspirate liquid from a wound when the multifunctional surgical instrument is in the fully closed position, and being operable to immediately prevent tissue damage during liquid aspiration by immediately stopping aspiration when opening the aspiration channel.

2. The multifunctional surgical instrument of claim 1, wherein the aspiration half-channels taper to a blunt atraumatic point at the distal end when the instrument's legs are oriented in the fully closed position, and/or wherein the aspiration half-channels are made of a transparent material configured to allow visualization inside the half-channels.

3. The multifunctional surgical instrument of claim 1, wherein at least one of the legs of the instrument further comprises at least one surgical probe element.

4. The multifunctional surgical instrument of claim 3, wherein the at least one surgical probe element is configured for carrying out one or more of the following: bipolar electrosurgery, monopolar electrosurgery, electrocautery, hyfrecator type electrosurgery, cryosurgery, argon plasma surgery, laser surgery, ultrasonic surgery and microwave surgery.

5. The multifunctional surgical instrument of claim 3, wherein each leg of the instrument comprises a surgical probe element and wherein the surgical probe element comprises an electrode of a bipolar electrosurgical forceps, wherein the aspiration half-channels comprise an electrically insulating material and house the electrodes.

6. The multifunctional surgical instrument of claim 5, wherein the electrodes comprise blunt atraumatic distal ends wherein each of the blunt atraumatic distal ends comprises an inner face shaped to hold, electrosurgically coagulate, desiccate, vaporize and/or fulgurate tissue.

7. The multifunctional surgical instrument of claim 5, wherein the multifunctional surgical instrument further comprises at least one irrigation channel configured to allow the flow of an irrigation fluid from a fluid-tight irrigation connection at the proximal portion to an irrigation orifice at a distal end of the irrigation channel, the fluid-tight connection being configured to couple the at least one irrigation channel to an irrigation fluid source.

8. The multifunctional surgical instrument of claim 7, wherein the irrigation orifice is positioned closer to the proximal portion of the instrument than the blunt atraumatic distal ends such that irrigation fluid tends to flow towards at least one of the blunt atraumatic distal ends.

9. The multifunctional surgical instrument of claim 7, wherein the blunt atraumatic ends further comprise an outer face, which is convex and substantially rounded in shape.

10. The multifunctional surgical instrument of claim 6, wherein the electrodes further comprise an opposing blade on an inner face of each electrode wherein the opposing blades are positioned at a distance from the blunt atraumatic distal ends of the electrodes such that the blades do not interfere with tissue holding and electrosurgical techniques.

11. The multifunctional surgical instrument of claim 1, wherein the aspiration connection is configured to couple the aspiration channel to an external suction mechanism.

12. The multifunctional surgical instrument of claim 7, wherein the proximal portion of the surgical instrument further comprises: an energy connection configured to couple each surgical probe element to a respective energy source.

13. A system comprising the multifunctional surgical instrument of claim 12 and a control unit, the control unit being configured to allow independent switching on/off of energy supply, irrigation fluid flow and aspiration and to control a value of one or more of the following parameters: voltage, current, frequency, wave form, intensity, temperature, irrigation fluid flow rate, irrigation fluid pressure, aspiration rate and the negative pressure of aspiration, wherein the connections are also connected to the control unit.

14. The system of claim 13, wherein the control unit comprises:

a first foot pedal for control of the at least one surgical probe element, a second foot pedal for the control of irrigation and a third foot pedal for the control of aspiration; or a first manual switch for control of the at least one surgical probe element, a second manual switch for the control of irrigation and a third manual switch for the control of aspiration.

15. The multifunctional surgical instrument of claim 1, wherein the at least one aspiration orifice comprises a plurality of aspiration orifices, wherein at least one of the plurality of aspiration orifices is located within 1 mm of the most distal point of the instrument.

16. The multifunctional surgical instrument of claim 15, wherein all of the plurality of aspiration orifices are located within 5 mm of the most distal point of the instrument.

* * * * *